J. H. RICHARDS.
ENGINE STARTING DEVICE.
APPLICATION FILED DEC. 21, 1918.
1,310,093.
Patented July 15, 1919.
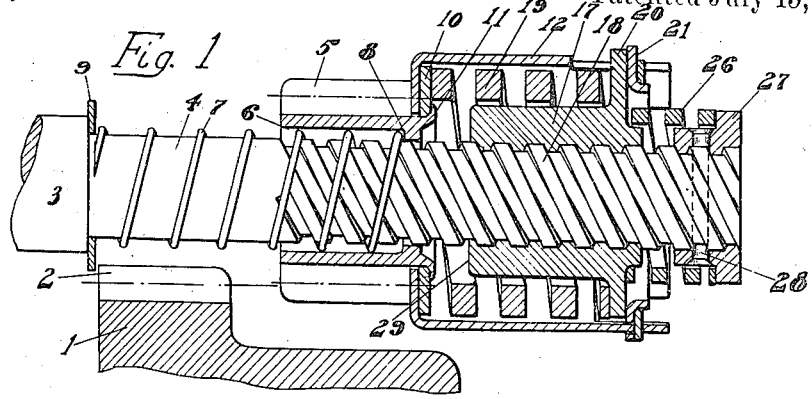
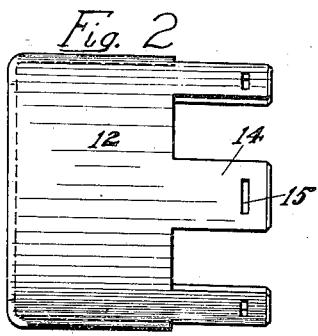
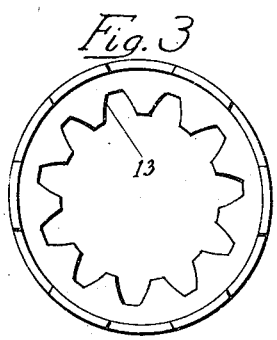
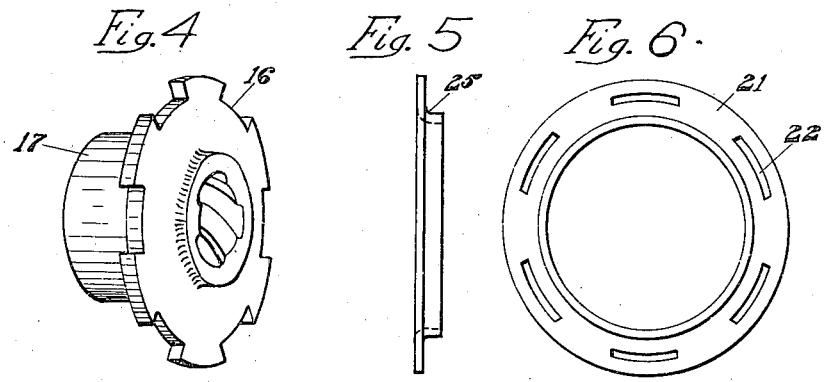
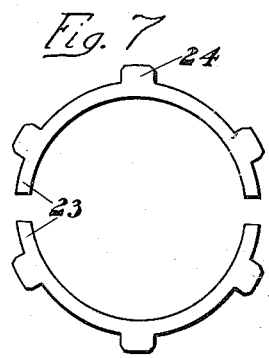
INVENTOR
JULIUS H. RICHARDS
BY
Albion T. Libby
ATTORNEY

UNITED STATES PATENT OFFICE.

JULIUS H. RICHARDS, OF SPRINGFIELD, MASSACHUSETTS.

ENGINE-STARTING DEVICE.

1,310,093.      Specification of Letters Patent.      Patented July 15, 1919.

Application filed December 21, 1918. Serial No. 267,838.

*To all whom it may concern:*

Be it known that I, JULIUS H. RICHARDS, a citizen of the United States, residing at Springfield, in the county of Hampden and State of Massachusetts, have invented certain new and useful Improvements in Engine-Starting Devices, of which the following is a specification.

In the use of internal combustion engines on auto-vehicles it has become almost universal practice to crank them by means of an electric motor receiving its power from a storage battery. Various methods of applying the electric motor to the engine have been proposed and used. A very common method of engagement involves the use of a weighted pinion connected to the starting motor shaft through the medium of a sleeve and a heavy spring, the driving pinion being automatically moved into and out of engagement with the engine driven member, such as a gear on the flywheel, when current is applied to the electric motor. Such an arrangement is known as the Bendix drive.

There are certain limitations to a drive of this kind, one such being the number of teeth that may be cut on the driving pinion to get a high gear ratio of engagement, due to the use of a sleeve over the drive shaft; that is to say, the lower the number of teeth on the pinion with a certain fixed number of teeth on the flywheel the greater will be the purchase of the starting motor on the engine. Another objection to the Bendix drive is the length of same and the cost of manufacturing.

Another type of drive, known as the Bijur drive, is in use and which consists in general of a screw threaded shaft having a nut carried on the threaded portion and a gear on the unthreaded portion and provided with a driving connection between the nut and gear including a friction clutch device and a spring between the nut and gear to take the shock of large motors at the time of engagement with the engine driven member. In my application Serial No. 264,102, filed November 25, 1918, I have shown and described a friction clutch starting device much simpler, smaller and more compact than the devices above referred to.

It is the object of my present invention to do away with all of the friction clutch parts and thereby still further simplify and cheapen the cost of manufacture of the engine starting device. In doing this, I have used the main spring to perform the function of holding certain of the parts in working relationship so as to prevent rattling, etc., also to take up the shock of engagement, as well as to transmit a part of the starting torque, all of which will be hereinafter pointed out.

Other and further objects will be apparent to one skilled in the art, after a study of the specification and drawings attached thereto, in which—

Figure 1 is a part plan and sectional view of my starting device in its normal position.

Fig. 2 is a plan view of one of the elements.

Fig. 3 is a left hand end view of Fig. 2.

Fig. 4 is a perspective view of the rigid member or nut which transmits the power of the starting motor shaft to the driving gear.

Fig. 5 is a side elevation of an end plate constituting a part of the device.

Fig. 6 is a plan view of Fig. 5.

Fig. 7 is a view of the locking means used to hold certain of the parts together.

Referring now to the details, wherein like numbers refer to corresponding parts in the various views, 1 illustrates an engine driven member, which in the form shown, is a flywheel, that carries gear teeth 2. 3 is the end of a starting motor shaft. The motor itself is not shown as this forms no part of my present invention and its functions are well understood. The shaft 3 is reduced in diameter as at 4 and has a gear wheel or driving pinion 5 slidably carried thereon. In the Bendix drive the interior bore of the pinion 5 is threaded to run on a threaded sleeve and in the Bijur type of drive heretofore referred to, the bore of the pinion 5 is smooth and engages a smooth or uncut portion of the shaft, but in my improved device the larger interior bore 6 of the pinion is sufficient to allow a resilient member 7 to extend therein, one end of the member 7 resting against the shoulder 8 on the bottom of the bore 6 and the other end against the collar 9 abutting against the large portion of the shaft 3. The right hand end of the pinion 5, which I term the non-working end, since it is not engaged by the flywheel, has the teeth preferably turned off to the root and a collar 10 placed thereon and the remaining portion of the stock of the pinion 5 is spun over at 11 to hold the collar 10 rigidly in place on the pinion 5. The collar 10 may be fastened to the gear 5 in any other suitable manner, such as being arc welded thereto. A drum 12, having its end perforated at 13 to conform with the size and number of the teeth on the pinion 5, is carried on the pinion adjacent the collar 10. The other end of the drum 12 has fingers 14 with slots 15 therein. The fingers 14 are adapted to rest within the slots 16 on a flange of a rigid member or nut 17 that is threaded to run on the screw threads 18 on the shaft end 4. After the collar 9, spring 7, pinion 5, on which the collar 10 and drum 12 are supported, have been assembled on the shaft end 4, the spring 19 is inserted within the drum 12 so that one end rests against the collar 10 and the other end against the flange 20 of the nut 17 which has been screwed onto the threads 18. After these parts have been assembled, as previously outlined above, the end plate 21, having slots 22 to engage the fingers 14, is put in position and the locking members 23, having projections 24 adapted to enter the slots 15, are dropped into position where they are held by the flange 25 of the end plate 21. A buffer spring 26 is then assembled on the end of the shaft followed by a stop 27, preferably in the form of a nut, that is pinned to the shaft by a pin 28.

Briefly the operation of my device is as follows: When current is applied to the starting motor the shaft 3 begins to turn, but, due to the inertia of the pinion 5 and the mechanism attached thereto, this does not turn but advances longitudinally of the shaft into engagement with the teeth 2 on the flywheel 1 until the end of the pinion 5 hits the collar 9, thereby stopping its longitudinal movement. Due to the driving force of the motor, the nut 17 continues to advance, the fingers 14 of the drum 12 slipping in the grooves 16 of the flange 20, compressing the spring 19 until the end 29 of the nut 17 engages the end of the pinion 5. The driving torque will then be transmitted from the nut 17 directly to the pinion 5 but a certain portion of it will be transmitted through the spring 19, which, from what has been said above, will be seen to act as to take up the shock of the engagement. It is also seen that spring 19, which is under a certain initial tension to hold the drum in proper relation with reference to the pinion 5 and nut 17, acts thereby with the drum to assist the nut 17 in moving the pinion 5 longitudinally into operative relationship with the engine driven member. It will also be seen that the spring 7 is compressed within the interior bore 6 and thereby serves as a support for the pinion 5 during the cranking operation.

After the engine has started on its own power, the engine driven member begins to turn faster than the pinion 5 is driven by the starting motor and the entire engaging mechanism is screwed out of engagement in the well known manner. As the disengagement takes place the end of the nut 17 engages the buffer spring 26, compressing it against the stop 27, so that little or no noise is made by the disengagement and the spring 7 then holds the moving parts in disengaged position. The spring 7 also tends to prevent shock of engagement.

By the construction shown and described, it will be seen that the projecting end of the driving motor shaft carrying the starting device is materially shortened over devices now in use and the machine work thereon is reduced to a minimum, there being but one shoulder to turn where the collar 9 is placed. I have thus reduced the number of parts very materially and consequently the cost of manufacture, and have accomplished the object sought in a more direct and simpler manner than has been accomplished heretofore.

It will be readily understood that although I have shown my starting device adapted to be engaged by the flywheel that the engine driven member may be some other gear operated by the engine.

In the drawing, I have shown a drive of the "inboard" type, that is to say, a type in which the starting pinion is moved toward the starting motor and no bearing is required on the outer end of the driving shaft. It will be understood that my device is readily susceptible to the necessary changes to make it into an "outboard" type, or one in which the driving shaft has an outboard bearing external to the starting motor, both types being in use in the trade. It is also to be understood that various parts of my device may be changed in other details without departing from the spirit of my invention and the scope of the appended claims.

Having thus described my invention, what I claim is:—

1. A drive for engine starters comprising a rotatable shaft, a driving member mounted thereon for both longitudinal and rotary movement thereof and rotary movement therewith and adapted to coöperate with and drive a member of the engine to be started, a control member mounted on said shaft for longitudinal and rotary movement thereof and rotary movement therewith, means connecting the driving and control members for causing the driving member to engage the member on the engine to be started and a driving connection formed after such engagement is made by the control member traveling longitudinally forward into engagement with the driving member.

2. A drive for engine starters comprising a rotatable shaft having a screw-threaded portion, a driving member mounted thereon for both longitudinal and rotary movement thereof and rotary movement therewith and adapted to coöperate with and drive a member of the engine to be started; a screw control member mounted on the threaded portion of the shaft, means connecting the driving and control members for causing the driving member to engage the member on the engine to be started and a driving connection formed after such engagement is made by the control member traveling longitudinally forward into engagement with the driving member.

3. A drive for engine starters comprising a rotatable screw shaft, a driving member mounted for longitudinal and rotary movement with relation to the shaft and rotary movement therewith, a screw member mounted for longitudinal movement on said shaft and controlling the relative movements of the driving member, and a driving connection established between the said screw and driving members after the driving member has moved to its limit in one direction, by final longitudinal movement of the screw member.

4. A drive for engine starters comprising a rotatable screw shaft, a driving member mounted for longitudinal and rotary movement with relation to the shaft and rotary movement therewith, a screw member mounted on said shaft and controlling the relative movements of the driving member, a driving connection established between the said screw and driving members after the driving member has moved to its limit in one direction by final longitudinal movement of the screw member and a spring for cushioning the establishment of the driving connection.

5. A drive for engine starters comprising a rotatable shaft, a driving member mounted thereon for both longitudinal and rotary movement thereof and rotary movement therewith and adapted to coöperate with and drive a member of the engine to be started, a control member mounted on said shaft for longitudinal and rotary movement thereof and rotary movement therewith, a drum carried on the driving member and extending rearwardly into sliding engagement with the control member, a spring housed within the drum serving to hold the driving and control members in normal position whereby the driving member is caused to engage the member on the engine to be started and a driving connection formed after such engagement is made by the control member traveling forward into engagement with the driving member, said spring also serving to take up the shock of such engagement.

6. A drive for engine starters comprising a rotatable screw shaft, a screw member screw threaded thereon for rotary movement therewith and longitudinal movement thereof, a pinion surrounding the shaft and in spaced axial alinement with said member, a driving connection between the member and pinion established by the longitudinal movement of the member and a spring serving to absorb the shock of establishing such connection, such spring also serving to hold the member and pinion in normal spaced relationship as described.

7. In apparatus of the class described, in combination with a member connected with an engine to be started, a driving shaft, a driving member slidably carried on said shaft and normally out of coöperation with the engine member, a nut threaded on said shaft in longitudinal alinement with the said driving member and a single yieldable member interposed between said nut and said driving member, said yieldable member serving as one of its functions to hold the driving member in normal spaced relationship with the nut.

8. The combination of a rotatable screw shaft, a driving member, a spring, a slidable drum, a screw member screw-threaded on the shaft and operatively connected with the driving member through said spring and slidable drum for longitudinal movement and drivingly connected for rotary movement with the driving member by direct engagement therewith after the longitudinal movement has ceased.

9. In a starter for gas engines and the like, a combined shifting and starting member including; a drum, a driving gear supporting one end of said drum, a rigid member slidably connecting the other end of the drum to a motor driven element, and a spring positioned between said gear and rigid member.

10. In a starter for gas engines and the like a combined shifting and starting member including; a motor driven element and a driving gear slidably carried thereon, a drum supported at one end on said gear, a rigid member supporting and slidably connecting the other end of the drum to the motor driven element, a spring within the drum between the gear and the rigid member, a stop on the motor driven element and a spring between said stop and the rigid member for the purpose described.

11. In a starting device the combination of, an engine driven member having gear teeth thereon, a driving shaft having threaded and unthreaded portions, a nut carried on the threaded portion, a gear having two smooth bores to slide on said shaft into engagement with the gear on said engine driven member when said shaft and nut are set in motion, operative means between the nut and gear and a driving connection established therebetween after the gear has engaged with the gear on the engine driven member and a spring on the shaft seated in the larger of said two bores for helping support the gear when in mesh with the gear on the engine driven member and for holding the gear normally away from the engine driven member.

12. In a starting device for gas engines and the like, a starting motor shaft having a reduced threaded portion, a stop member fixed in position on its extreme end and a spring on the reduced end opposite from the stop member; a movable device on the threaded shaft end consisting of; a gear counterbored to form a drum, a seat for said spring and carrying one end of said drum, a nut slidably engaging the other end of the drum and closing the end thereof, a spring extending between the gear and nut, an end plate detachably fastened to the drum to hold it in working position on the nut, and a spring between the nut and stop member, said movable device being normally held against the last mentioned spring and stop by the first mentioned spring for the purpose described.

13. In a drive for starting motors, means for shortening the drive consisting of a threaded shaft having a buffer spring and stop on its end and a movable device made up of the following instrumentalities; a drum, a gear carrying one end of said drum, a nut on the threaded shaft, quick detachable means for holding the drum in slidable relation to the nut and a spring tensioned between the gear and nut; a shoulder on the shaft, a spring positioned at one end against said shoulder, said gear being counterbored for the major part of its length to form a seat for the other end of said spring which serves normally to hold the movable device against said buffer spring and stop and also as a support for the gear when in driving position.

14. In apparatus of the class described in combination, an engine driven gear, a threaded shaft driven by a starting motor, a driving gear slidably carried on said shaft, a nut carried on the threaded part of said shaft, means consisting of a spring and drum positioned between the gear and nut for sliding the gear longitudinally into mesh with the engine driven gear, said spring also serving to take the shock of such engagement and to transmit part of the starting motor torque as described.

15. In apparatus of the class described, in combination an engine driven gear, a driving gear adapted to coöperate therewith, a spring and means normally separated from said gear by said spring but driven by a starting motor for transmitting a part of the driving torque through the spring and the balance through the engagement by compression of said spring of the said means with the driving gear.

In witness whereof, I affix my signature.

JULIUS H. RICHARDS.